US010133485B2

(12) United States Patent
Henson

(10) Patent No.: US 10,133,485 B2
(45) Date of Patent: Nov. 20, 2018

(54) INTEGRATING STORAGE RESOURCES FROM STORAGE AREA NETWORK IN MACHINE PROVISIONING PLATFORM

(75) Inventor: Scott Jared Henson, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1135 days.

(21) Appl. No.: 12/628,041

(22) Filed: Nov. 30, 2009

(65) Prior Publication Data

US 2011/0131384 A1 Jun. 2, 2011

(51) Int. Cl.
*G06F 3/06* (2006.01)
*H04L 29/08* (2006.01)

(52) U.S. Cl.
CPC ............ *G06F 3/0605* (2013.01); *G06F 3/067* (2013.01); *G06F 3/0631* (2013.01); *H04L 67/1097* (2013.01)

(58) Field of Classification Search
CPC ...... G06F 3/0605; G06F 3/067; G06F 3/0631; H04L 67/1097
USPC ........................................................ 709/226
See application file for complete search history.

(56) References Cited

U.S. PATENT DOCUMENTS

| | | | |
|---|---|---|---|
| 5,787,246 A | | 7/1998 | Lichtman et al. |
| 5,835,719 A | | 11/1998 | Gibson et al. |
| 5,881,236 A | * | 3/1999 | Dickey .......................... 709/221 |
| 5,948,062 A | | 9/1999 | Tzelnic et al. |
| 6,105,100 A | | 8/2000 | Dean et al. |
| 6,212,585 B1 | | 4/2001 | Chrabaszcz |
| 6,243,747 B1 | | 6/2001 | Lewis et al. |
| 6,272,536 B1 | | 8/2001 | van Hoff et al. |
| 6,381,742 B2 | | 4/2002 | Forbes et al. |
| 6,415,289 B1 | | 7/2002 | Williams et al. |
| 6,438,711 B2 | | 8/2002 | Woodruff |
| 6,516,427 B1 | | 2/2003 | Keyes et al. |
| 6,526,442 B1 | | 2/2003 | Stupek et al. |
| 6,550,021 B1 | | 4/2003 | Dalphy et al. |
| 6,557,169 B1 | | 4/2003 | Erpeldinger |
| 6,594,664 B1 | | 7/2003 | Estrada et al. |

(Continued)

OTHER PUBLICATIONS

Westphal, Kristy. "NFS and NIS Security". securityfocus.com. Jan. 22, 2001. pp. 1-7.*

(Continued)

*Primary Examiner* — John M Macilwinen
(74) *Attorney, Agent, or Firm* — Lowenstein Sandler LLP

(57) ABSTRACT

Embodiments relate to systems and methods for integrating storage resources from a storage area network in a machine provisioning platform. A provisioning platform can communicate generate and maintain a provisioning profile encoding the software, hardware, and/or other resources to be provisioned to a target physical and/or virtual machine. The provisioning profile can include a set of storage allocations for each target machine to be provisioned by the platform, indicating the high-level amounts, types, availability, so forth to be associated with each target. The provisioning profile can likewise include a set of storage specifications indicating specific disk types, manufacturers, and specific sources or pools in the set of storage resources available to the storage area network to transparently fulfill the storage allocations. The target(s) can be assigned an alias to identify them to the SAN, and the provisioning platform can mount the corresponding storage resources during the provisioning or updating process.

21 Claims, 4 Drawing Sheets

(56) References Cited

U.S. PATENT DOCUMENTS

| | | |
|---|---|---|
| 6,625,742 B1 | 9/2003 | Owhadi et al. |
| 6,686,838 B1 | 2/2004 | Rezvani et al. |
| 6,751,659 B1 | 6/2004 | Fenger et al. |
| 6,757,837 B1 | 6/2004 | Platt et al. |
| 6,769,022 B1 | 7/2004 | DeKoning et al. |
| 6,779,004 B1 | 8/2004 | Zintel |
| 6,801,992 B2 * | 10/2004 | Gajjar et al. ................. 711/173 |
| 6,807,579 B1 * | 10/2004 | Frazier ......................... 709/245 |
| 6,845,464 B2 | 1/2005 | Gold |
| 6,865,737 B1 | 3/2005 | Lucas et al. |
| 6,871,001 B1 * | 3/2005 | Okada ................... H04N 19/51 |
| | | 375/E7.027 |
| 6,947,939 B2 | 9/2005 | Fujibayashi et al. |
| 6,986,033 B2 | 1/2006 | Miyamoto et al. |
| 7,013,461 B2 | 3/2006 | Hellerstein et al. |
| 7,051,101 B1 | 5/2006 | Dubrovsky et al. |
| 7,107,330 B1 | 9/2006 | Hamilton et al. |
| 7,133,822 B1 | 11/2006 | Jacobson |
| 7,165,109 B2 | 1/2007 | Chiloyan et al. |
| 7,185,071 B2 | 2/2007 | Berg et al. |
| 7,200,845 B2 | 4/2007 | Morrison et al. |
| 7,340,637 B2 | 3/2008 | Nagoya |
| 7,350,112 B2 | 3/2008 | Fox et al. |
| 7,356,679 B1 | 4/2008 | Le et al. |
| 7,395,322 B2 | 7/2008 | Harvey et al. |
| 7,506,040 B1 | 3/2009 | Rabe et al. |
| 7,506,151 B2 | 3/2009 | Miyamoto et al. |
| 7,516,218 B2 | 4/2009 | Besson |
| 7,519,691 B2 | 4/2009 | Nichols et al. |
| 7,574,481 B2 | 8/2009 | Moore et al. |
| 7,600,005 B2 | 10/2009 | Jamkhedkar et al. |
| 7,606,868 B1 | 10/2009 | Le et al. |
| 7,640,325 B1 | 12/2009 | DeKoning et al. |
| 7,681,080 B2 | 3/2010 | Abali et al. |
| 7,707,618 B1 * | 4/2010 | Cox et al. .......................... 726/1 |
| 7,716,316 B2 | 5/2010 | Nichols et al. |
| 7,734,717 B2 | 6/2010 | Saarimaki et al. |
| 7,827,261 B1 | 11/2010 | Griswold et al. |
| 7,831,997 B2 | 11/2010 | Eldar et al. |
| 7,937,437 B2 | 5/2011 | Fujii |
| 2002/0062259 A1 | 5/2002 | Katz et al. |
| 2002/0078186 A1 | 6/2002 | Engel et al. |
| 2002/0138567 A1 | 9/2002 | Ogawa |
| 2002/0162028 A1 | 10/2002 | Kennedy |
| 2002/0188697 A1 * | 12/2002 | O'Connor ............. G06F 3/0614 |
| | | 709/219 |
| 2003/0005097 A1 | 1/2003 | Barnard et al. |
| 2003/0055919 A1 | 3/2003 | Fong et al. |
| 2003/0061491 A1 * | 3/2003 | Jaskiewicz et al. .......... 713/182 |
| 2003/0069884 A1 | 4/2003 | Nair et al. |
| 2003/0069946 A1 | 4/2003 | Nair et al. |
| 2003/0070110 A1 | 4/2003 | Aija et al. |
| 2003/0074549 A1 | 4/2003 | Paul et al. |
| 2003/0110173 A1 | 6/2003 | Marsland |
| 2003/0119480 A1 | 6/2003 | Mohammad |
| 2003/0126585 A1 | 7/2003 | Parry |
| 2003/0195921 A1 | 10/2003 | Becker et al. |
| 2003/0212992 A1 | 11/2003 | Ronning et al. |
| 2003/0221063 A1 * | 11/2003 | Eguchi .................. G06F 3/0605 |
| | | 711/114 |
| 2004/0006616 A1 | 1/2004 | Quinn et al. |
| 2004/0015831 A1 | 1/2004 | Bowhill |
| 2004/0015957 A1 | 1/2004 | Zara et al. |
| 2004/0019876 A1 | 1/2004 | Dravida et al. |
| 2004/0024984 A1 | 2/2004 | Lanzatella et al. |
| 2004/0044643 A1 | 3/2004 | deVries et al. |
| 2004/0054789 A1 | 3/2004 | Breh et al. |
| 2004/0059703 A1 | 3/2004 | Chappell et al. |
| 2004/0064501 A1 | 4/2004 | Jan et al. |
| 2004/0128375 A1 | 7/2004 | Rockwell |
| 2004/0143664 A1 | 7/2004 | Usa et al. |
| 2004/0167975 A1 | 8/2004 | Hwang et al. |
| 2004/0215755 A1 | 10/2004 | O'Neill |
| 2004/0223469 A1 | 11/2004 | Bahl et al. |
| 2005/0028025 A1 | 2/2005 | Zalewski et al. |
| 2005/0033935 A1 * | 2/2005 | Manbert ............... G06F 3/0608 |
| | | 711/170 |
| 2005/0050175 A1 | 3/2005 | Fong et al. |
| 2005/0114474 A1 | 5/2005 | Anderson et al. |
| 2005/0125525 A1 | 6/2005 | Zhou et al. |
| 2005/0177829 A1 | 8/2005 | Vishwanath |
| 2005/0182796 A1 | 8/2005 | Chu et al. |
| 2005/0198629 A1 | 9/2005 | Vishwanath |
| 2005/0223374 A1 | 10/2005 | Wishart et al. |
| 2006/0041767 A1 | 2/2006 | Maxwell et al. |
| 2006/0080659 A1 | 4/2006 | Ganji |
| 2006/0095230 A1 | 5/2006 | Grier et al. |
| 2006/0095702 A1 | 5/2006 | Hickman et al. |
| 2006/0155857 A1 | 7/2006 | Feenan et al. |
| 2006/0173912 A1 | 8/2006 | Lindvall et al. |
| 2006/0174018 A1 | 8/2006 | Zhu et al. |
| 2006/0190575 A1 | 8/2006 | Harvey et al. |
| 2006/0190773 A1 | 8/2006 | Rao et al. |
| 2006/0200658 A1 | 9/2006 | Penkethman |
| 2006/0215575 A1 | 9/2006 | Horton et al. |
| 2006/0218544 A1 | 9/2006 | Chakraborty et al. |
| 2006/0230165 A1 | 10/2006 | Zimmer et al. |
| 2006/0282479 A1 | 12/2006 | Johnson et al. |
| 2007/0015538 A1 | 1/2007 | Wang |
| 2007/0067419 A1 | 3/2007 | Bennett |
| 2007/0101118 A1 | 5/2007 | Raghunath et al. |
| 2007/0118654 A1 | 5/2007 | Jamkhedkar et al. |
| 2007/0168721 A1 | 7/2007 | Luiro et al. |
| 2007/0169093 A1 | 7/2007 | Logan et al. |
| 2007/0192158 A1 | 8/2007 | Kim |
| 2007/0204338 A1 | 8/2007 | Aiello et al. |
| 2007/0226810 A1 | 9/2007 | Hotti |
| 2007/0244996 A1 | 10/2007 | Ahmed et al. |
| 2007/0276905 A1 | 11/2007 | Durand et al. |
| 2007/0288612 A1 | 12/2007 | Hall |
| 2007/0294376 A1 | 12/2007 | Ayachitula et al. |
| 2007/0299951 A1 | 12/2007 | Krithivas |
| 2008/0028048 A1 | 1/2008 | Shekar et al. |
| 2008/0040452 A1 | 2/2008 | Rao et al. |
| 2008/0046708 A1 | 2/2008 | Fitzgerald et al. |
| 2008/0059959 A1 | 3/2008 | Chen et al. |
| 2008/0130639 A1 | 6/2008 | Costa-Requena et al. |
| 2008/0189693 A1 | 8/2008 | Pathak |
| 2008/0196043 A1 | 8/2008 | Feinleib et al. |
| 2008/0235266 A1 | 9/2008 | Huang et al. |
| 2008/0235361 A1 | 9/2008 | Crosbie et al. |
| 2008/0244325 A1 | 10/2008 | Tyulenev |
| 2008/0270674 A1 | 10/2008 | Ginzton |
| 2008/0288938 A1 | 11/2008 | DeHaan |
| 2008/0288939 A1 | 11/2008 | DeHaan |
| 2008/0294777 A1 | 11/2008 | Karve et al. |
| 2008/0301666 A1 | 12/2008 | Gordon et al. |
| 2008/0313716 A1 | 12/2008 | Park |
| 2008/0320110 A1 | 12/2008 | Pathak |
| 2009/0007091 A1 | 1/2009 | Appiah et al. |
| 2009/0055901 A1 | 2/2009 | Kumar et al. |
| 2009/0064132 A1 | 3/2009 | Suchy et al. |
| 2009/0089567 A1 | 4/2009 | Boland et al. |
| 2009/0089852 A1 | 4/2009 | Randolph et al. |
| 2009/0106291 A1 | 4/2009 | Ku et al. |
| 2009/0129597 A1 | 5/2009 | Zimmer et al. |
| 2009/0132682 A1 | 5/2009 | Counterman |
| 2009/0132710 A1 | 5/2009 | Pelley |
| 2009/0158148 A1 | 6/2009 | Vellanki et al. |
| 2009/0158272 A1 | 6/2009 | El-Assir et al. |
| 2009/0164522 A1 | 6/2009 | Fahey |
| 2009/0165099 A1 | 6/2009 | Eldar et al. |
| 2009/0172430 A1 | 7/2009 | Takenouchi |
| 2009/0228868 A1 * | 9/2009 | Drukman et al. ............ 717/121 |
| 2009/0240835 A1 | 9/2009 | Adelman et al. |
| 2009/0259665 A1 | 10/2009 | Howe et al. |
| 2009/0265707 A1 | 10/2009 | Goodman et al. |
| 2009/0282404 A1 | 11/2009 | Khandekar et al. |
| 2009/0285199 A1 | 11/2009 | Strahs et al. |
| 2010/0023740 A1 | 1/2010 | Moon et al. |
| 2010/0049838 A1 | 2/2010 | DeHaan |
| 2010/0050169 A1 | 2/2010 | DeHaan |
| 2010/0054156 A1 | 3/2010 | DeHaan |
| 2010/0057833 A1 | 3/2010 | DeHaan |

(56) References Cited

U.S. PATENT DOCUMENTS

| | | |
|---|---|---|
| 2010/0057890 A1 | 3/2010 | DeHaan |
| 2010/0057913 A1 | 3/2010 | DeHaan |
| 2010/0057930 A1 | 3/2010 | DeHaan |
| 2010/0058307 A1 | 3/2010 | DeHaan |
| 2010/0058327 A1 | 3/2010 | DeHaan |
| 2010/0058328 A1 | 3/2010 | DeHaan |
| 2010/0058330 A1 | 3/2010 | DeHaan |
| 2010/0058332 A1 | 3/2010 | DeHaan |
| 2010/0058444 A1 | 3/2010 | DeHaan |
| 2010/0082799 A1 | 4/2010 | DeHaan et al. |
| 2010/0083245 A1 | 4/2010 | DeHaan et al. |
| 2010/0100876 A1 | 4/2010 | Glover et al. |
| 2010/0128639 A1 | 5/2010 | DeHaan et al. |
| 2010/0131648 A1 | 5/2010 | DeHaan |
| 2010/0138521 A1 | 6/2010 | DeHaan et al. |
| 2010/0138526 A1 | 6/2010 | DeHaan et al. |
| 2010/0138696 A1 | 6/2010 | DehHaan et al. |
| 2010/0199276 A1* | 8/2010 | Umbehocker ............... 718/1 |
| 2010/0217837 A1 | 8/2010 | Ansari et al. |
| 2010/0217840 A1 | 8/2010 | DeHaan et al. |
| 2010/0217843 A1 | 8/2010 | DeHaan et al. |
| 2010/0217848 A1 | 8/2010 | DeHaan et al. |
| 2010/0217944 A1 | 8/2010 | DeHaan et al. |
| 2010/0218243 A1 | 8/2010 | DeHaan et al. |
| 2010/0220584 A1 | 9/2010 | DeHaan et al. |
| 2010/0223367 A1 | 9/2010 | DeHaan |
| 2010/0223504 A1 | 9/2010 | DeHaan et al. |
| 2010/0223607 A1 | 9/2010 | DeHaan |
| 2010/0223608 A1 | 9/2010 | DeHaan et al. |
| 2010/0223609 A1 | 9/2010 | DeHaan et al. |
| 2010/0223610 A1 | 9/2010 | DeHaan et al. |

OTHER PUBLICATIONS

Agrawal et al. "Policy-Based Validation of SAN Configuration". IEEE Policy'04. 2004. pp. 1-10.*

Red Hat Enterprise Linux 5 Administration Unleashed Sam's Publishing. Excerpts from Chapters 1, 2, 7 and 13. 2007. pp. 1-71.*

Henson, "Systems and Methods for Mounting Specified Storage Resources from Storage Area Network in Machine Provisioning Platform", U.S. Appl. No. 12/627,988, filed Nov. 30, 2009.

DeHaan, "Systems and Methods for Cloning Target Machines in a Software Provisioning Environment", U.S. Appl. No. 12/473,014, filed May 27, 2009.

DeHaan, "Systems and Methods for Providing Configuration Management Services from a Provisioning Server", U.S. Appl. No. 12/414,941, filed Mar. 31, 2009.

DeHaan, "Systems and Methods for Retiring Target Machines by a Provisioning Server", U.S. Appl. No. 12/475,427, filed May 29, 2009.

DeHaan, "Systems and Methods for Message-Based Installation Management Using Message Bus", U.S. Appl. No. 12/495,077, filed Jun. 30, 2009.

HP Storage Essentials SRM 6.0 Installation Guide. Jan. 2008. HP. 1st ed. Part No. T4283-96113. pp. 1-5, 97-136, 219-228.

HP Storage Essentials SRM 6.0 User Guide. Jan. 2008. HP. 1st ed. Part No. T4238-96114. pp. 1-83.

Michael DeHaan. "Unfiled Provisioning". 2007, pp. 1-29.

Michael DeHaan. "Provisioning With Cobbler". 2007, pp. 1-28.

Tan et al. "A WBEM Basked Disk Array Management Provider". 2005. IEEE. 2005 International Conference on Cyberworlds, pp. 1-5.

Lovelace et al. Managing Disk Subsystems using IBM TotalStorage Productivity Center. Sep. 2005. IBM. 2nd ed. SG24-7097-01. pp. 1-42.

Doc Searls "Linux for Suits", 2005, Specialized System Consultants Inc., vol. 2005, pp. 1-5.

eBook "Microsoft System Management Sewer 2003 Administrator's companion", Microsoft Press, c2004, Ch. 13, Patch Management, pp. 471-507.

Butt et al., "Automated Installation of Large-Scale Linux Networks", 2000, pp. 1-6.

Agarwalla, "Automating Provisioning of Complete Software Stack in a Grid Environment", 2004, pp. 1-18.

Anderson et al., "Technologies for Large-Scale Configuration Management", Dec. 9, 2002, pp. 1-61.

Grosse, "Repository Mirroring", 1995, pp. 1-9.

* cited by examiner

INTEGRATING STORAGE RESOURCES FROM STORAGE AREA NETWORK IN MACHINE PROVISIONING PLATFORM

FIELD

The present teachings relate to systems and methods for integrating storage resources from a storage area network in a machine provisioning platform, and more particularly to platforms and techniques for incorporating and configuring storage hosted in a storage area network into a newly provisioned or updated machine.

BACKGROUND OF RELATED ART

Provisioning platforms exist which permit a systems administrator or other user to instantiate, configure, and provision software installations on physical and virtual machines. Available provisioning platforms can, for instance, allow an administrator to create a profile or template for the operating system, application set, security, and other resources of a group of target machines. The provisioning platform can then, for example, invoke local installation daemons or other logic to distribute the selected operating system code and other code and resources down to the target machine in a "bare metal" or initial physical installation, an update delivery, and/or to a virtual machine hosted in a cloud or other network.

In the case of storage configurations, existing provisioning platforms can register the physical storage attached to one or more target machines, and reflect the available hard disk, optical disk, and/or other resources with the provisioning server or other logic, to record the configurations of the deployed machines. In existing provisioning platforms, however, there is no mechanism to integrate storage from an independent storage area network (or SAN) into the configuration profile of a set of new or updated machines. Existing provisioning platforms likewise lack the ability to select, specify, or configure specific storage sources from a SAN that can be accessed or used to fulfill the storage specifications of a newly provisioned or updated machine being serviced by the provisioning server. It may be desirable to provide methods and systems for integrating storage resources from a storage area network in a provisioning platform, wherein interfaces to the storage resources of a SAN can be built into the configuration process for newly provisioned or updated machines.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Figure 1:
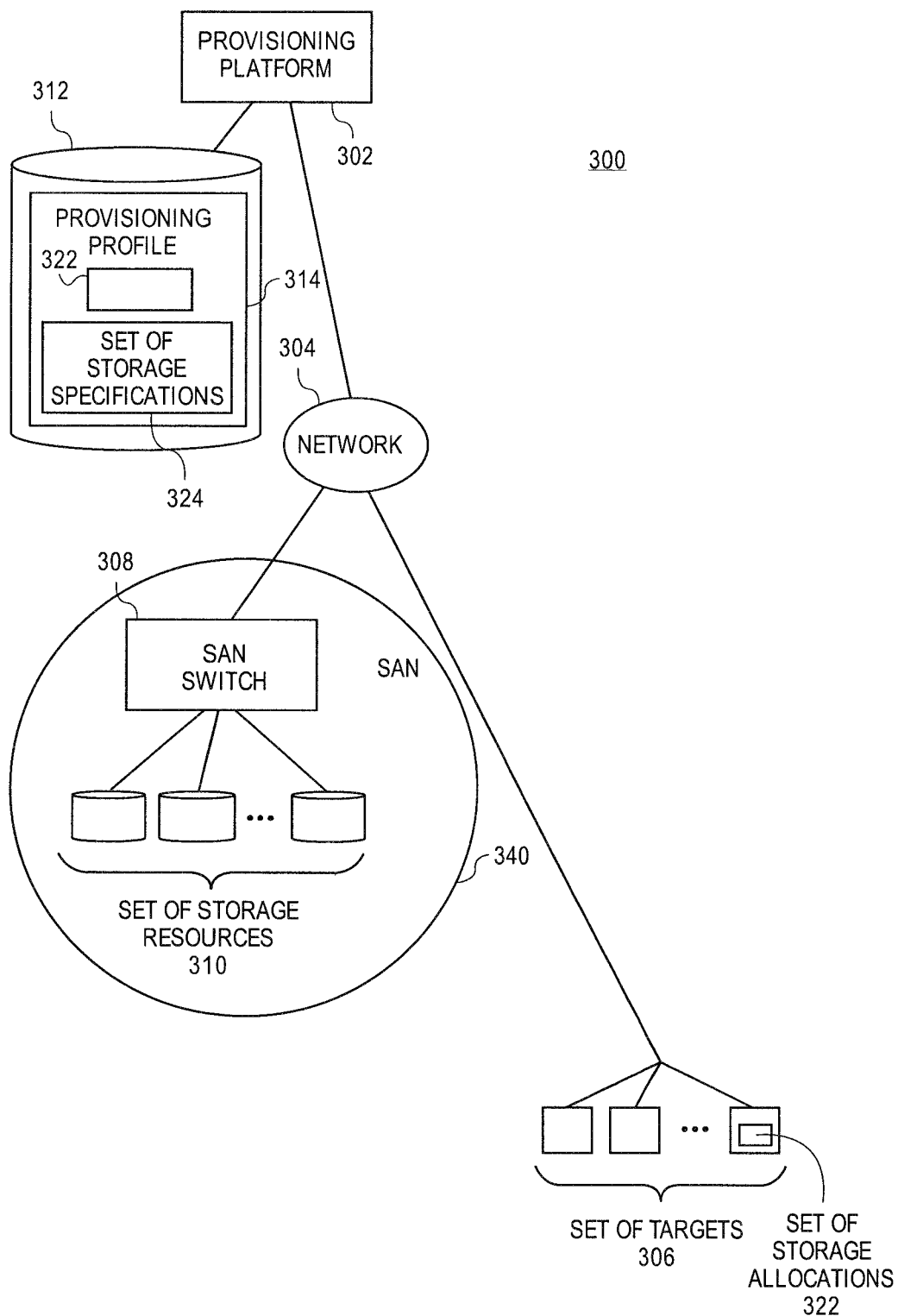
FIG. 1 illustrates an overall system in which systems and methods for integrating storage resources from a storage area network in a machine provisioning platform can be implemented, according to various embodiments.

Embodiments of the present teachings relate to systems and methods for integrating storage resources from a storage area network in a machine provisioning platform. More particularly, embodiments relate to platforms and techniques which include a provisioning platform, communicating with set of target machines to prepare and configure those machines, for network operation. In embodiments, the set of target machines under provisioning control can be or include physical or hardware-implemented machines, virtual machines, and/or combinations of each. According to aspects, provisioning activity can take place using a set of templates or profiles which encode the set of operating system, application software, communications, security, storage, and/or other hardware, software, or other resources to be implemented or hosted in each of the target machines.

In embodiments, at the time of provisioning or updating the configuration of one or more target machines, the provisioning platform can also incorporate information that can be used to associate the target machine(s) with a storage area network (SAN). The SAN identification information can permit the configured target to identify, access and/or mount storage resources located in the SAN, as part of the original or updated configuration process for the machine. In embodiments, the SAN identification information can comprise a world wide port name, as well as an alias which defines the target machine(s) as a node in the SAN network fabric. The SAN identification information can also include addressing or other information that can be used to locate and configure each target machine at sync time when provisioning operations are initiated, or at later times downstream of the initial provisioning activity. According to embodiments, each target machine can thereby integrally incorporate an allocation of storage resources, such as hard disk, optical, backup, and/or other resources, directly in the provisioning profile or template for that machine or other node. In embodiments, that storage allocation can comprise a size, amount, type, availability, and/or other specification for the storage resources to be extracted or assigned to the target(s) from the SAN.

According to embodiments, in addition to the high level storage allocations registered to each target in the provisioning profile or template, a set of storage specifications for the storage hardware to be accessed or used to fulfill the high level allocations can also be built into the provisioning profile or template. In aspects, the set of storage specifications can comprise a set of lower level specifications or parameters that can be used to locate, access, and/or mount particular storage hardware, software, or other resources to fulfill the high level storage allocations. For instance, in embodiments, the set of storage specifications can comprise information regarding or identifying hard disk or optical disk size, speed, level of redundancy such as RAID (redundant array of inexpensive disk) backup level, storage availability, preferred hardware vendors, and/or other specifications or details for the storage hardware to be used according to a target machine's high level storage allocation.

According to embodiments, a systems administrator or other user can, for instance, update or change the set of storage specifications for a target machine or class of target machines, without necessarily changing or updating the set of high level storage allocations assigned to those machines. In aspects, specific storage hardware assets can be installed, updated, changed, or substituted, transparently to the users of the target machines, since the high level storage allocations can remain the same. These and other embodiments described herein address the various noted shortcomings in known provisioning platform technology, and provide a user or network operator with enhanced flexibility and power in the management of provisioning operations.

Reference will now be made in detail to exemplary embodiments of the present teachings, which are illustrated in the accompanying drawings. Where possible the same reference numbers will be used throughout the drawings to refer to the same or like parts.

FIG. 1 illustrates an overall network 300 in which systems and methods for integrating storage resources from a storage area network in a machine provisioning platform can operate, according to various embodiments. In embodiments, provisioning platform 302 can be or include provisioning platforms, hardware, software, and other resources such as those described in co-pending U.S. patent application Ser. No. 11/763,315 which is U.S. Pat. No. 8,185,891 and U.S patent application Ser. No. 11/763,333 which is U.S. Pat. No. 8,132,166, each of which applications is assigned or under obligation of assignment to the same entity as this application, the disclosures of which applications are incorporated herein, in their entirety, by reference. In embodiments, provisioning platform 302 can comprise provisioning platforms, hardware, software, and other resources other than those described in the aforementioned co-pending U.S. patent applications.

In embodiments as shown in FIG. 1, a systems administrator and/or other user can use or access provisioning platform 302 to set up, configure, monitor, and manage the provisioning of one or more machines in set of targets 306. In embodiments, provisioning platform 302 can host, access, and/or manipulate a provisioning profile 314 and/or other template to manage the provisioning, delivery, and/or configuration of software, hardware, and/or other resources to one or more machines or nodes in set of targets 306. In embodiments, set of targets 306 can comprise one or more servers, hosts, clients, targets, desktop computers, laptop computers, and/or other machines, nodes, or destinations. In embodiments, set of targets 306 can be or include network-enabled cellular telephones, network-enabled media playback devices, network-enabled gaming devices, and/or other devices, machines, and/or hardware. In embodiments, set of targets 306 can likewise or instead comprise one or more virtual machines. Virtual machines can comprise virtual machines instantiated under a virtual machine monitor and/or operating system configured to operate virtual machines and their associated resources. In embodiments, virtual machines in set of targets 306 can also or instead include cloud-based machines or resources.

According to embodiments, and as generally shown in FIG. 1, provisioning platform 302 can generate and store a set of storage allocations 322 for each machine in set of targets 306, indicating the high-level type, performance, and/or other parameters that will be assigned to a target. In embodiments, some or all of the set of storage allocations 322 can be fulfilled, hosted, implement, or otherwise realized using storage resources 310 of SAN 340, such as hard disks, optical disks, RAID arrays, solid state or electronic storage, and/or other storage resources. Set of storage allocations 322 can for instance comprise entries or fields for one, two, or more hard disks and/or optical disks, each with a given allocated size in gigabytes or other measures. Set of storage allocations 322 can likewise be or include entries or fields indicating that a target or other machine will be entitled to a certain amount, such as for instance 20 terabytes, of RAID storage or tape backup, and/or other backup resources or services. Other types, amounts, and configurations of storage can be encoded for a given machine in set of storage allocations 322. In embodiments, set of storage allocations 322 can be stored in provisioning profile 314 stored in provisioning store 312, but can, as illustrated, also or instead be stored in a target machine to which those resources are allocated. In embodiments, in addition to the comparatively high-level set of storage allocations 322, including storage amounts, provisioning platform 302 can also store set of storage specifications 324, which can likewise be stored in provisioning profile 314, in the target machine(s) themselves, and/or other data stores or destinations. In embodiments, set of storage specifications 324 can specify, for each target, group of targets, and/or other machines or nodes, the manufacturer, vendor, software compatibility specifications, and/or other comparatively low-level specifications of hardware present in SAN 340 from which SAN switch 308, provisioning platform 302, and/or other logic will provide the physical storage to fulfill set of storage allocations 322 for given target machine(s). In embodiments, set of storage specifications 324 can specify that for hard disk allocations, a given machine will be assigned one or more 500 gigabyte hard disks manufactured by X Corp., having a SCSI-III (small computer systems interface, version 3) interface rated at 10 megabytes/sec transfer rate on a 32 bit bus. Other specifications in set of storage specifications 324 are possible. In embodiments, provisioning platform 302 can assign, update, and/or change the assignments of physical resources in set of storage resources 310 used to satisfy the set of storage allocations 322 for one or more machines in set of targets 306. In embodiments, the assignment of particular storage resources via lookup in set et storage specifications 324 can be transparent to a user or provisioning platform 302, set of targets 306, and/or other resources.

Figure 2:
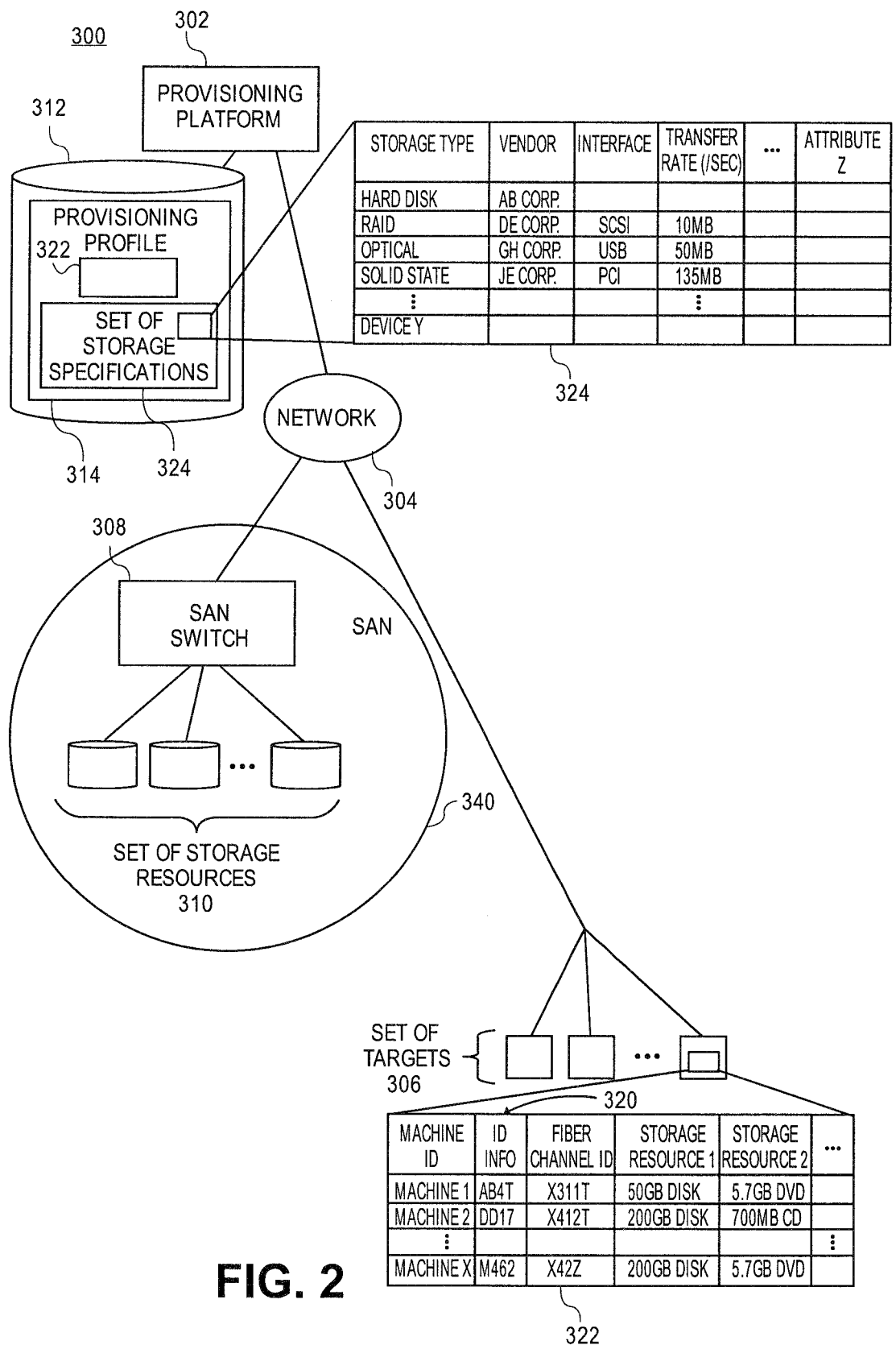
FIG. 2 illustrates an overall system in which systems and methods for integrating storage resources from a storage area network in a machine provisioning platform can be implemented, according to various further embodiments.

More particularly, and as for instance shown in FIG. 2, provisioning platform 302 can host or store SAN identification information 320 for each machine, node, or host in set of targets 306, which identification information can locate or identify the machine configured to receive a set of storage allocations 322 from SAN 340. In embodiments, SAN identification information 320 can be or include a world wide port name (WWPN) identifier, which can act to identify one or more machines in set of targets 306 to SAN 340, including SAN switch 308 and/or other logic in the fabric of SAN 340. In embodiments, when provisioning platform 302 enters its sync phase in the execution of provisioning activity, and writes out a dhcp.conf (dynamic host control protocol.inf) file and/or initiates other provisioning activity, provisioning platform 302 can also log into SAN switch 308. Provisioning platform 302 can identify the WWPN or other SAN identification information 320 with a fiber channel alias or other identifier of the target machine(s). Provisioning platform 302 can also add the machine(s) being provisioned in set of targets 306 to any netgroups that are required to access defined storage under a network file system (NFS), and/or other network directory structure.

In embodiments, provisioning platform 302 can generate, access, update, and manage set of storage specifications 324 to fulfill the set of storage allocations 322 for a given target machine or machines. In embodiments, set of storage specifications can be stored into provisioning profile 314, and/or can be stored or registered to individual target machine(s) being provisioned. In embodiments, set of storage specifications 324 can comprise a record of a storage source, which can comprise one storage device or a pool of devices, and a destination mount associated with the provisioned machine(s). In embodiments, set of storage specifications 314 can contain an explicit reference to a storage source from within set of storage resources 310, in which case the storage can be generated and/or created on the target machine(s) or other host(s), with a directory path being specified. In embodiments, set of storage specifications 314 can store the identification of a storage pool in set of storage resources 310 rather than a discrete source, in which case provisioning platform 306 can select a device in the storage pool and instantiate or create the storage within that pool. In embodiments, the destination mount in the target machine(s) can be part of the kickstart process, such as the kickstart process described in the aforementioned U.S. patent application Ser. No. 11/763,315 and U.S. patent application Ser. No. 11/763,333 , although it will again be understood that other provisioning platforms and provisioning processes can be used. When integrated into a kickstart or similar process, the destination mount can be made part of the kickstart process, and can be set up in provisioning profile 314 to cause the recipient target machine(s) to automatically format and mount that source, or source pool, at installation time. It may be noted that while network file system (NFS) and Fiber Channel implementations have been noted in connection with SAN 340, in embodiments, other file structures and connection fabric could be used. For instance, in embodiments, common Internet file system (CIFS) and/or iSCSI (Internet small computer system interface) file systems or connection channels can be used, as well as others.

Figure 3:
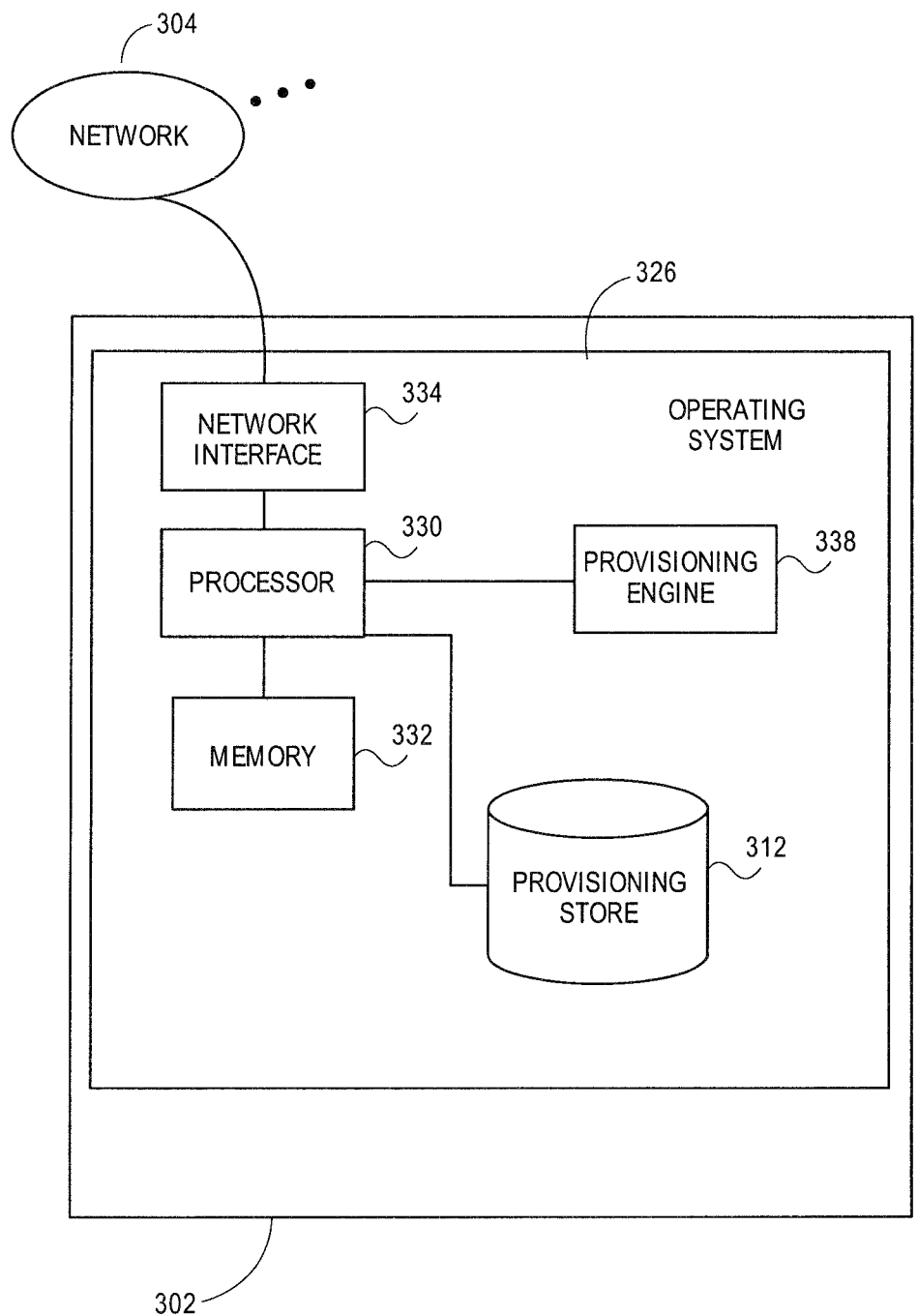
FIG. 3 illustrates an exemplary hardware configuration of a provisioning platform which can be used in systems and methods for integrating storage resources from a storage area network in a machine provisioning platform, according to various embodiments.

FIG. 3 illustrates an exemplary configuration of a provisioning platform 302 which can be used in systems and methods for integrating storage resources from a storage area network in a machine provisioning platform, according to embodiments. In embodiments as shown, provisioning platform 302 can comprise a processor 330 communicating with memory 332, such as electronic random access memory, operating under control of or in conjunction with operating system 326. Operating system 326 can be, for example, a distribution of the Linux™ operating system, the Unix™ operating system, or other open-source or proprietary operating system or platform. Processor 330 also communicates with provisioning store 312, such as a local or remote database, which can be stored, for instance, on one or more hard drives, optical drives, magnetic drives, electronic memory, and/or other storage. Processor 330 further communicates with network interface 334, such as an Ethernet or wireless data connection, which in turn communicates with one or more network 304, such as the Internet or other public or private networks. Processor 330 can, for example, communicate with set of targets 306 via one or more network 304. Processor 330 can also communicate with a provisioning engine 338 which can comprise logic, hardware, and/or software resources for communicating with set of targets 306 and controlling provisioning activity on those machines and/or other nodes of managed network 304. Processor 330 can also communicate with SAN 340 including SAN switch 308, and/or and other resources to control the processing of provisioning and data storage allocation to set of targets 306, and/or other hosts, targets, machines, or nodes. Other configurations of provisioning platform 302, associated network connections, and other hardware and software resources are possible.

Figure 4:
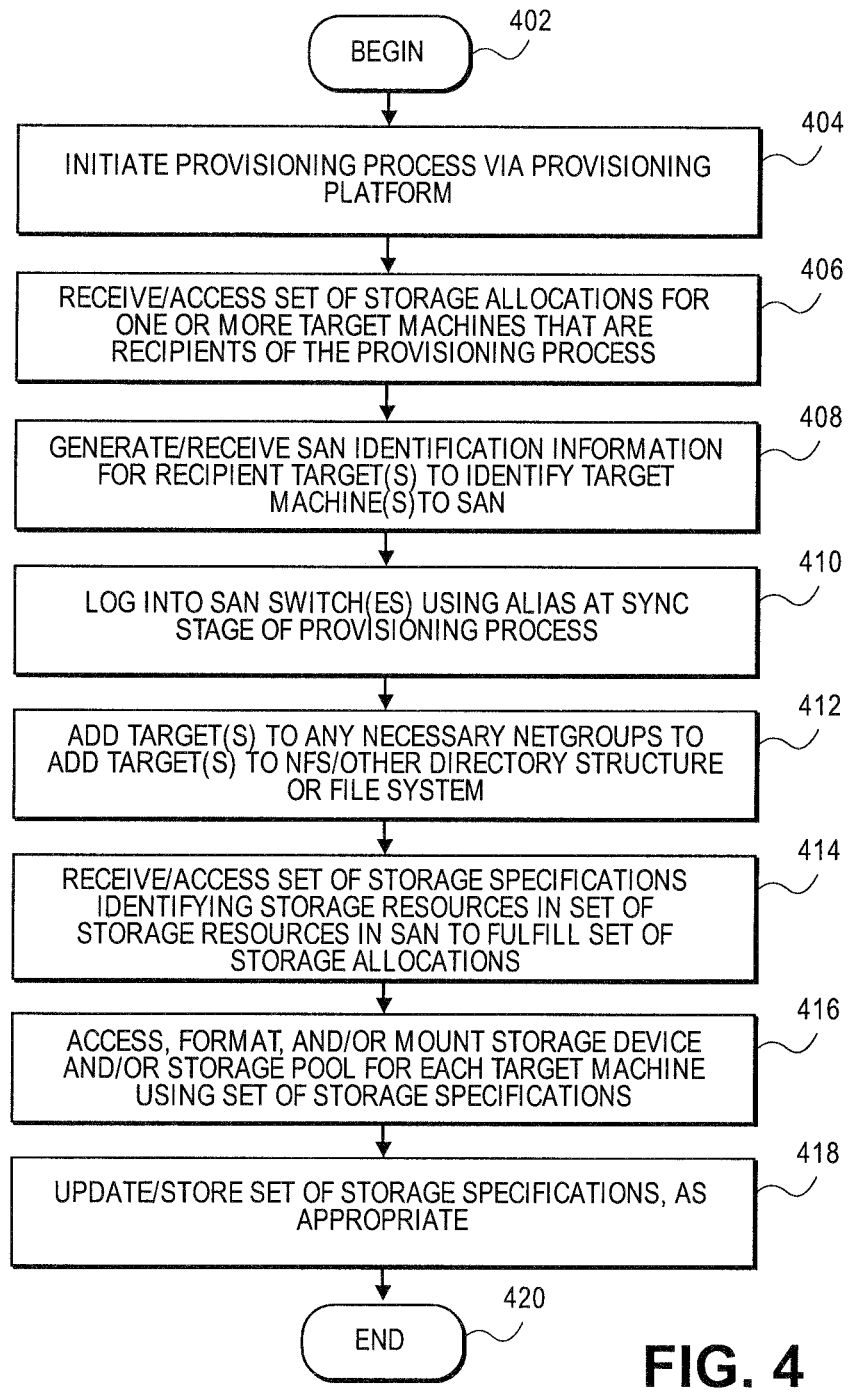
FIG. 4 illustrates overall processing that can be used in provisioning and storage allocation operations, according to various embodiments of the present teachings.

FIG. 4 illustrates a flowchart of data processing operations that can be used in systems and methods for integrating storage resources from a storage area network in a machine provisioning platform, according to various embodiments. In 402, processing can begin. In 404, a provisioning, updating, and/or other distribution process can be initiated, for instance via provisioning platform 302 and/or other logic or resources. In 406, set of storage allocations 322 for one or more targets or machines in set of targets 306 that are the intended recipients of the provisioning process can be received and/or accessed. In 408, SAN identification information 320 associated with one or more recipient target machines to identify those machines to the SAN 340 and other network resources can be generated and/or received. In aspects, SAN identification information 320 can be or include an alias and/or other information which locates or identifies the target machine(s) to the SAN 340, managed network 304, and/or other networks, connections, or resources. In embodiments, the alias can comprise a network address such as an Internet address, a subnet address, a domain name, a machine identification such as a serial number, and/or other numeric, textual, or other tag, label, address, or identifier. In embodiments, the alias can be registered in a lookup table, for instance embedded in provisioning profile 314 or otherwise. In aspects, the alias information can be stored in association with or pointing to an address or other identifier to locate or identify the target machine(s) in or to SAN 340, managed network 304, or other network, connection, or resource. In aspects, multiple aliases can be associated together to specify a target machine or other entity using a plurality of identifiers. Other formats for the alias and related information can be used. In 410, provisioning platform 302 can log into one or more SAN switch 308 using the alias and/or other identification information at the sync stage or other initialization stage of the provisioning process for the selected machines in set of targets 306.

In 412, provisioning platform 302 can add the recipient target(s) to any necessary netgroups to add those machines, whether physical or virtual, to the network file system (NFS) and/or other directory structure and/or file system or file configuration used by SAN 340, one or more network 304, and/or set of targets 306. In 414, provisioning platform 302 can receive and/or access set of storage specifications 324 identifying storage resources in set of storage resources 310 available in or to SAN 340 to fulfill set of storage allocations 322. In 416, provisioning platform 302 and/or other logic or resources can access, format, and/or mount one or more storage device and/or storage pool for each target machine using set of storage specifications 324. In 418, provisioning platform and/or other logic or resources can update and/or store set of storage specifications 324 and/or set of storage allocations 322, as appropriate. For instance, set of storage specifications 324 can be updated to reflect a substitute or additional RAID server or installation available in SAN 340, and which will be used to supply SAID requirements set out in set of storage allocations 322. In 420, processing can repeat, return to a prior processing point, jump to a further processing point, or end.

The foregoing description is illustrative, and variations in configuration and implementation may occur to persons skilled in the art. For example, while embodiments have been described which operate with one provisioning platform 302 and one SAN switch, in embodiments, multiple provisioning servers and/or other provisioning platforms and/or multiple storage area network switches can be used. For further example, while embodiments have been described in which one set of targets 306 may be provisioned together, in embodiments, multiple sets or groups of targets, or entire networks, can be provisioned and/or managed at the same time or in conjunction with the same provisioning processes. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
identifying storage allocations for a target machine;
assigning alias information to the target machine identifying the target machine to a storage area network;
accessing, using a processor, a storage specification associated with the storage area network using the alias information to provision storage resources to the target machine;
updating an assignment of storage resources of the storage area network associated with the target machine in view of the storage specification;
distributing, using the processor, an operating system software to host on the target machine in view of a provisioning profile comprising instructions to cause the target machine to format the storage resources using the storage specification that specifies a data transfer rate of a communication interface for the storage resources; and
responsive to formatting the storage resources in view of the provisioning profile, updating, using the processor, the storage allocations for the target machine to reflect an identifier of a newly available resource.

2. The method of claim 1, wherein the storage allocations comprise at least one of: an amount of storage, a storage device type, a storage availability rating, or a backup allocation for the target machine.

3. The method of claim 1, wherein the alias information comprises a world wide port number (WWPN) associated with the target machine.

4. The method of claim 3, wherein the alias information further comprises a Fiber Channel (FC) alias associated with the world wide port number.

5. The method of claim 1, wherein the storage area network uses a network file system (NFS).

6. The method of claim 5, further comprising adding the target machine to a netgroup to register the target machine to a network file system (NFS) file configuration.

7. The method of claim 1, wherein the target machine comprises a physical machine.

8. The method of claim 1, wherein the target machine comprises a virtual machine.

9. The method of claim 1, further comprising identifying storage specification for the storage resources in view of the provisioning profile, the storage specification used in formatting the storage resources.

10. The method of claim 1, wherein the updating of the assignment of storage resources comprises identifying a storage resource in the storage area network to satisfy a resource speed level in accordance with the storage specification.

11. The method of claim 1, wherein the updating of the assignment of storage resources comprises identifying a storage resource in the storage area network to satisfy a vendor specification in accordance with the storage specification.

12. A provisioning system comprising:
an interface to a target machine; and
a processor, operatively coupled with the interface to communicate with the target machine, the processor to:
identify storage allocation requirements of the target machine;
assign alias information to the target machine identifying the target machine to a storage area network;
access a storage specification associated with the storage area network using the alias information to provision storage resources to satisfy the storage allocation requirements of the target machine;
update an assignment of storage resources of the storage area network associated with the target machine in view of the storage specification;
distribute an operating system software to host on the target machine in view of a provisioning profile comprising instructions to cause the target machine to format the storage resources using the storage specification that specifies a transfer rate of an communication interface for the storage resources; and
responsive to formatting the storage resources in view of the provisioning profile, update the storage allocations for the target machine to reflect an identifier of a newly available resource.

13. The system of claim 12, wherein the storage allocations comprise at least one of: an amount of storage, a storage device type, a storage availability rating, or a backup allocation for the target machine.

14. The system of claim 12, wherein the alias information comprises a world wide port number (WWPN) associated with the target machine.

15. The system of claim 14, wherein the alias information further comprises a Fiber Channel (FC) alias associated with the world wide port number.

16. The system of claim 12, wherein the storage area network uses a network file system (NFS) file configuration.

17. The system of claim 16, wherein the processor is further configured to add the target machine to a netgroup to register the target machine to the network file system (NFS).

18. The system of claim 12, wherein the target machine comprises a physical machine.

19. The system of claim 12, wherein the target machine comprises a virtual machine.

20. A target machine, comprising:
a first interface to a provisioning platform;
a second interface to a storage area network; and
a processor, to communicate with the provisioning platform via the first interface and the storage area network via the second interface, the processor to:
identify storage allocation requirements of the target machine;
assign alias information to the target machine identifying the target machine to the storage area network;
access a storage specification associated with the storage area network using the alias information to provision storage resources to satisfy the storage allocation requirements of the target machine;
update an assignment of storage resources of the storage area network associated with the target machine in view of the storage specification;
distribute an operating system software to host on the target machine in view of a provisioning profile comprising instructions to cause the target machine to format the storage resources using the storage specification that specifies a transfer rate of an communication interface for the storage resources; and responsive to formatting the storage resources in view of the provisioning profile, update the storage allocations for the target machine to reflect an identifier of a newly available resource.

21. The target machine of claim 20, wherein the storage allocations are stored in a provisioning store associated with the provisioning platform.

\* \* \* \* \*